United States Patent [19]

Gladstone

[11] Patent Number: 4,572,147
[45] Date of Patent: Feb. 25, 1986

[54] AIR FILTRATION

[75] Inventor: Robert S. Gladstone, Abergavenny, Wales

[73] Assignee: Coopers Filters Limited, Manchester, England

[21] Appl. No.: 650,081

[22] Filed: Sep. 13, 1984

[30] Foreign Application Priority Data

Sep. 14, 1983 [GB] United Kingdom ............... 8324598

[51] Int. Cl.⁴ .......................................... F02M 31/00
[52] U.S. Cl. ....................................... 123/556; 236/86
[58] Field of Search ................. 123/556, 552; 236/86, 236/101 C, 101 E, 87

[56] References Cited

U.S. PATENT DOCUMENTS

| | | | |
|---|---|---|---|
| 3,394,687 | 7/1968 | Scott | 236/86 |
| 4,112,896 | 9/1978 | Akado | 123/556 |
| 4,178,898 | 12/1979 | Akado | 123/556 |
| 4,231,343 | 11/1980 | Alf | 123/556 |
| 4,244,343 | 1/1981 | Yamaguchi | 123/556 |
| 4,416,416 | 11/1983 | Maltby | 236/86 |

FOREIGN PATENT DOCUMENTS 1091553  11/1967  United Kingdom ................ 236/86

*Primary Examiner*—Ronald H. Lazarus
*Attorney, Agent, or Firm*—Cushman, Darby & Cushman

[57] ABSTRACT

An air temperature control device for the air intake of an internal combustion engine comprises a thermo-responsive actuator which is, in use, disposed to respond to the air temperature in said intake system, a first valve means operably connected to the actuator for progressive movement in a first chamber provided with air inlet and/or outlet ports between two positions, in the first of which positions a first bleed passage from the chamber is closed and in the second of which positions said first bleed passage is open permitting the passage of air to or from said ports from a second chamber provided with an air inlet which is connected in use to a vacuum motor operable to adjust the relative proportions of ambient and pre-heated air admitted to the intake system, and a second valve means to close said bleed passage and also operable to close a second bleed passage between said second chamber and a third chamber having a port which is connected (in use) to a vacuum source constituted by the air intake manifold of the engine, said second bleed passage being defined in pressure responsive wall member separating said second and third chambers.

7 Claims, 9 Drawing Figures

AIR FILTRATION

BACKGROUND

This invention relates to air temperature control devices for internal combustion engines. Such devices are well-known; they are used in an attempt to provide the engine air intake with air at a temperature appropriate to the operating conditions prevailing at a particular time. These operating conditions include such parameters as throttle setting, engine temperature and ambient air temperature.

BRIEF DESCRIPTION OF THE PRIOR ART

Air temperature control devices together with some preferred operational features are described in for example patent specifications Great Britain Pat. No. 1126157, Great Britain Pat. No. 1313434 and Great Britain Pat. No. 1361728. Thus it is known to use bimetallic strips and other thermo-responsive devices to actuate air valves of various kinds, either directly or through a servomotor. In particular, it is known to adjust the relative proportions of ambient air and preheated air to reflect the engine temperature and the ambient air temperature, especially under "cold start" conditions.

OBJECTS OF THE INVENTION

It is an object of the present invention to provide an air temperature control device having improved operating characteristics. It is a further object of the invention to provide an engine air intake systems fitted with the device.

BRIEF DESCRIPTION OF THE INVENTION

According to the present invention an air temperature control device for the air intake system of an internal combustion engine comprises a thermo-responsive actuator which is, in use, disposed to respond to the air temperature in said intake system, a first valve means operably connected to the actuator for progressive movement in a first chamber provided with an air inlet and/or outlet ports between two positions, in the first of which positions a first bleed passage from the chamber is closed and in the second of which positions said bleed passage is open permitting the passage of air to or from said ports to or from a second chamber provided a port which is connected, in use, to a vacuum motor operable to adjust the relative proportions of ambient and preheated air admitted to the intake system, and a second valve means engageable with the first valve means to close said bleed passage, third valve means operable to close a second bleed passage between said second chamber and a third chamber having an air outlet connected, in use, to the engine air intake manifold, said second bleed passage being defined in a pressure-responsive wall member separating said second and third chambers.

PREFERRED FEATURES OF THE INVENTION

The pressure responsive wall member is preferably a diaphragm and the second valve means is preferably a poppet valve mounted thereon and biased so as to close said second bleed passage, for example by means of a spring. The first valve means and the associated thermo-responsive actuator are preferably biased towards closure of the first bleed passage, with the actuator in its fully retracted cold state.

The air temperature control device is preferably provided with means for limiting the movement of the pressure responsive wall member in the direction of the air outlet.

The air outlet from the third chamber preferably incorporates a restriction, the purpose of which is to ensure that there is still a pressure drop when the actuator has opened the first valve means. This pressure drop serves to create a pressure intermediate that in the first chamber and that due to the vacuum source, namely the engine vacuum at the carburettor throat. The restriction may be achieved by selection of pipe size and/or length, but it will usually be more convenient to include a conventional narrow orifice, at the point of connection to the sensor, for example.

DESCRIPTION OF SPECIFIC EMBODIMENTS OF THE INVENTION

In order that the invention be better understood a particularly preferred embodiment of it will now be described by way of example with reference to the accompanying drawings in which:-

Figure 1:
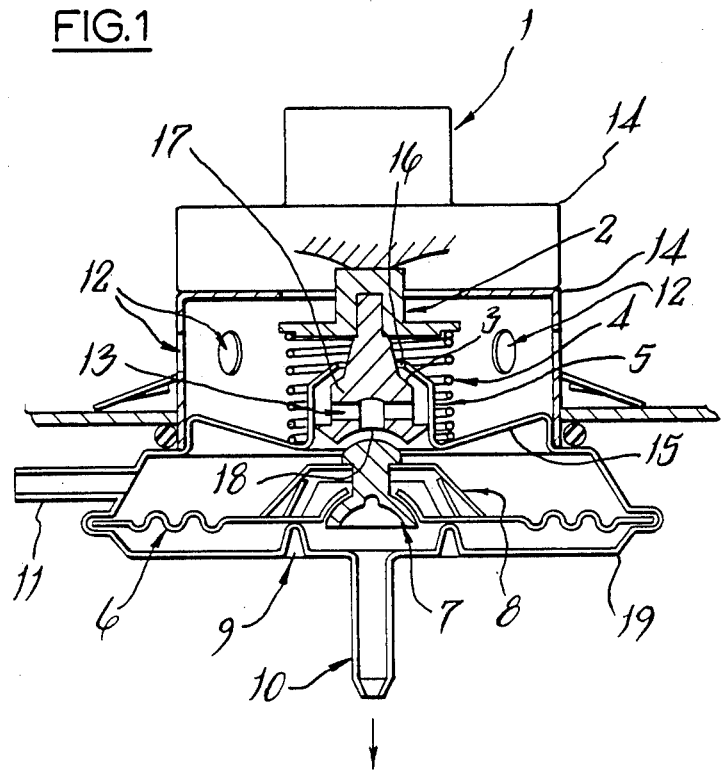
FIG. 1 is a cross-sectional side view, of an air temperature control device according to the invention.
Figure 2:
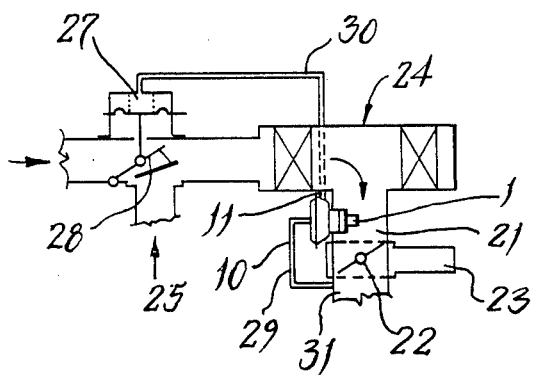
FIG. 2 is a diagrammatic side view, partly in section, of an internal combustion engine air intake system embodying the device of FIG. 1.

FIGS. 3 to 8 inclusive are diagrammatic illustrations of the device of FIG. 1 in conjunction with the vacuum motor of FIG. 2 when in use under various engine and ambient air temperatures and at different throttle settings.

Figure 9:
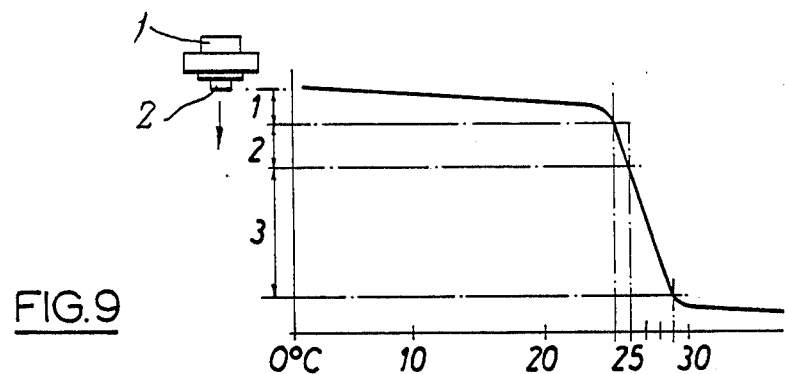

FIG. 9 is a temperature/displacement graph showing the preferred mode of operation of the thermo-responsive actuator portion of the device of FIG. 1.

Referring firstly to FIG. 1, the device comprises a thermo-responsive actuator 1 of the wax pellet type. This is seated on a housing 14 which constitutes the side wall of a first chamber provided with a plurality of ports 12. The first chamber is closed by a bottom wall 15 having a central tubular upstand 5 provided with an aperture 16 which constitutes a first bleed passage from the chamber.

The actuator 1 has a piston 2; a compression spring 4 biases the latter away from the bottom wall 15 towards its fully retracted state. The piston carries a bleed valve member 17 which extends into the tubular upstand 5 and has a sealing surface 3 adapted to seat against the rim of the upstand when the actuator is fully retracted. Air bleed passageways 13 extend through the member 17 and communicate with a downwardly facing port 18 located in a second chamber constituted by a peripheral flange portion of the wall 15 and a diaphragm 6. The central area of the latter is provided with an aperture containing the lower portion of a non-return poppet value 7 biased by a spring 8 to close the aperture. The second chamber has also a vacuum motor pipe connection port 11. The upper portion of the poppet valve is of complementary shape to that of the downwardly facing port 18 in the bleed valve member 17. A third chamber 18 is constituted by a bottom plate 19 crimped around the peripheral portions of the wall 15 and the diaphragm 6 to hold the assembly together. The bottom plate has an air outlet pipe 10 and an annular recess 9 which serves to limit the extent of movement of the centre of the diaphragm 6 towards the bottom wall. In the interests of clarity the sensor has been deliberately shown in FIG. 1 with the actuator 1 in a partially-operated state.

Referring now to FIG. 2, the device of FIG. 1 is mounted with the actuator 1 inside an internal combustion engine air intake passage 21 between the throttle valve 22 of a carburettor 23, and an air cleaner 24. The air cleaner is supplied with air from two sources, one a source of pre-heated air, 25, the other a source of ambient air, 26.

A vacuum servomotor 27 is provided to operate a flap valve 28 which enables the relative proportions of air from the two sources to be adjusted between the extremes of all hot pre-heated air and all-ambient temperature air. The vacuum motor is connected by a pipe 29 to the pipe connection 11 of FIG. 1. The air outlet pipe 10 of FIG. 1 is connected to a vacuum source constituted by a pipe 30 tapped into the carburettor throat downstream of the throttle valve 22.

Figure 3:
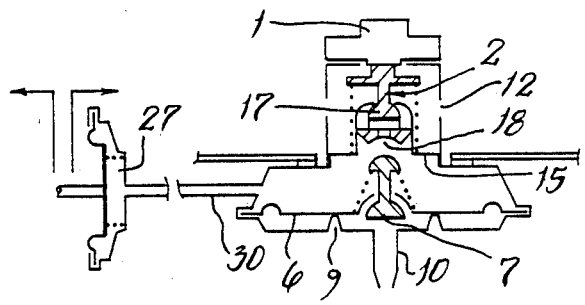
Figure 4:
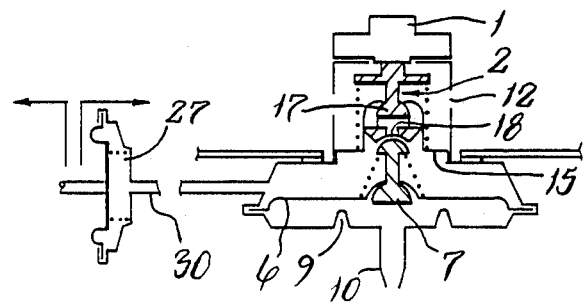

Referring now to FIGS. 3 to 8 inclusive, these show the system of FIG. 2 at various engine/ambient temperatures, with throttle settings in the closed (over-run) to partially open range and also under full throttle conditions. Taking the figures in turn, FIG. 3 is the completely cold start condition. There is a relatively high vacuum in the throat 31; this pulls the diaphragm firmly down onto the apex of the recess 9 and opens the poppet valve 7. Because the actuator is fully retracted, the bleed valve member 17 sealing surface 3 is seated against the rim of the upstand 5 and the reduced pressure in the second chamber is applied only to the servomotor 27 through the pipe connection 11. The servomotor moves the flap valve 28 to close off the ambient source 26, so that all intake air is drawn from the preheated source 25. In FIG. 4, application of full throttle to the cold system (25° C.) reduces the vacuum in the third chamber 18 and allows the poppet valve 7 to close. The reduced pressure thereby trapped in the second chamber lifts the diaphragm upwardly off the apex of recess 9 until the upper portion of the poppet valve hits the margins of the downwardly facing port 18 in the bleed valve member 17. This momentarily unseats the poppet valve and allows at least some equalisation of the pressures above and below the diaphragm before the poppet valve seats again.

The stiffness against upward movement of the diaphragm 6 gives the sensor the characteristics of a pressure regulator under full throttle conditions. The final pressure differential across the diaphragm will be a function of the clearance between the lower margin of port 18 and the lower (rest) position of the poppet value 7; it will therefore vary inversely with the degree of extension of the actuator 1.

However, the net effect is a slight reduction in the vacuum applied to the servomotor so that some ambient air is allowed to enter the intake to increase engine power.

Figure 5:
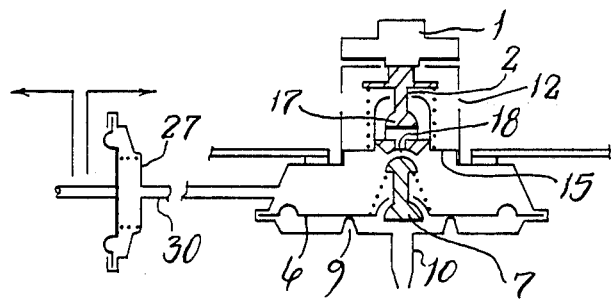

In FIG. 5 the device is as depicted in the partially warmed-up condition achieved when pre-heated air has caused the actuator 1 to operate, pushing the piston and bleed valve member 17 down against the spring 4. The sealing surface 3 unseats from the rim of the upstand 5, allowing air to bleed into the second chamber from the intake passage via ports 12, 13 and 18. This further reduces the vacuum developed under light (or closed) throttle conditions and the servomotor admits more ambient air. The cooling effect of the latter on the actuator 1 is such that the position of the actuator will depend very largely on the ambient temperature, once the system is thoroughly warmed up. Thus at low (cold) ambient temperatures (typically below 7° C.) very little ambient air is needed to maintain a desired air intake temperature of say 25° to 30° C. The higher the ambient temperature, the greater the proportion of ambient air needed to achieve/maintain the desired air intake temperature, of course.

Figure 6:
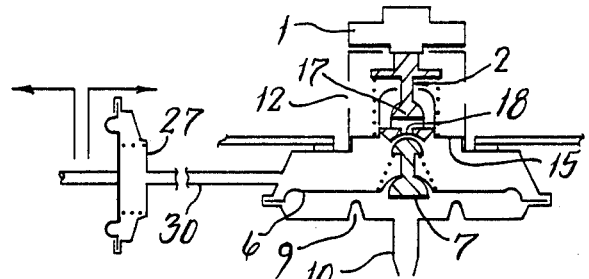

In FIG. 6, still only partially warmed-up, or when the ambient temperature is low (say 7° C.), the full throttle condition is very much as in FIG. 4, but because the actuator has started to operate, the diaphragm need not lift as far to momentarily unseat the poppet valve. However, at the same time, the upper portion of the poppet valve will close the port 18, thereby preventing the entry of air from ports 12 into the second chambers. The reduction in the vacuum applied to the servomotor will however be somewhat greater, due to the regulating action of the diaphragm 6 and the poppet valve 7.

Accordingly, more ambient (cold) air will be allowed into the intake, but not so much that carburettor icing occurs.

Figure 7:
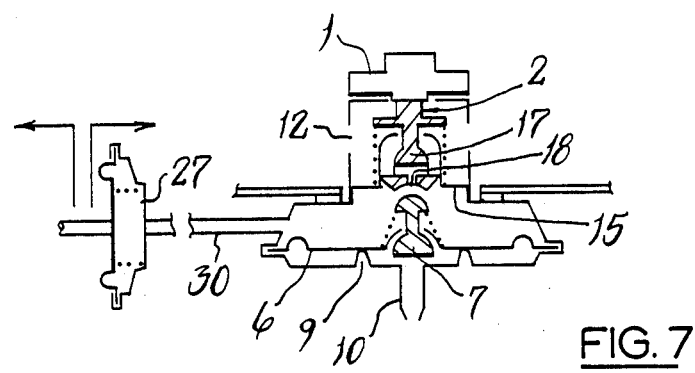
Figure 8:
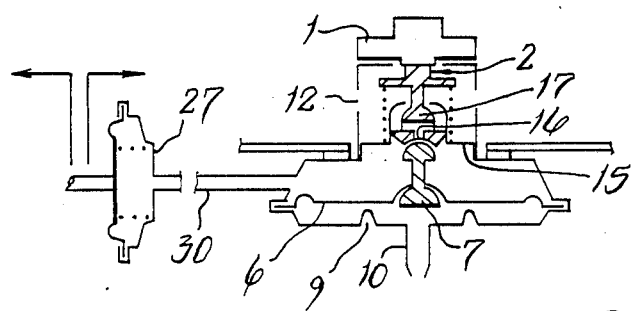

When the engine is warm and the ambient air temperature is high, the actuator is fully operated as shown in FIG. 7 and the vacuum in the second chamber is minimal, so that the servomotor hardly operates. The air intake is therefore predominantly all at ambient temperature. Under the FIG. 8 full throttle condition the diaphragm has only to rise very slightly to unseat the poppet valve, so that the increase in pressure (fall in vacuum in the throat 31) is communicated to the servomotor, ensuring that the latter closes off the pre-heated air source to give maximum engine power by virtue of admitting only ambient air to the air cleaner.

FIG. 10 shows the actuator movement as a function of temperature corresponding to the three conditions (1, 2 and 3 on the graph) represented by the three pairs of figures, namely FIGS. and 4, 5 and 6 and 7 and 8 respectively.

What I claim is:

1. An air temperature control device for proportioning the quantity of ambient and preheated air to the air intake system of an internal combustion engine, said device comprising housing means having defined therein first, second and third chamber spaced apart by first and second internal wall means, said first chamber being defined by the area between the housing and the first wall, the second chamber being defined by the area between the first and second walls, and the third area defined by the area between the housing and the second wall, the first of which is rigid and the second of which is flexible, each chamber having a port defined in said housing for external communications, said first chamber having thermo-responsive actuator means responsive to air temperature in said air intake system, first valve means operable to bias said actuator means between two positions in the first of which said valve means closes a first bleed passage through said rigid wall between said first and second chambers, and in the second of which said bleed passage is open, together with second valve means progressively operable by said first valve means on approaching its second position, said second valve means being biassed to constitute a one way valve closing a bleed passage defined in said flexible wall, whereby until said actuator operates to open said first bleed passage, air may be drawn from the external communication port of the third chamber through said one way valve only from the external communication port of the second chamber, said flexible wall responding to the relative pressure difference between said second and third chamber to at least in part regulate said difference in accordance with the air temperature sensed by said actuator means a source of vacuum being provided by the air intake manifold, said source of vacuum being supplied to said device through one said ports, said device also being connected through another of said ports to a vacuum motor which is operable through means associated therewith to proportion the quantity of ambient and preheated air to the air intake system.

2. The control device of claim 1 wherein the flexible wall is a diaphragm and the second valve means is a poppet valve mounted thereon and biased so as to close said second bleed passage.

3. The control device of claim 1 wherein the first valve means and the thermo-responsive actuator means are biased towards closure of the first bleed passage with the actuator in a fully retracted, cold state.

4. The control device of claim 1 wherein the actuator means is a wax pellet device.

5. The control device of claim 1 wherein the actuator means is substantially fully retracted below about 10° C.

6. The control device of claim 1 provided with means for limiting the movement of the flexible wall member in a direction towards the port connected to the vacuum source.

7. The control device of claim 1 wherein the port from said third chamber is connected to the air intake system through a restriction whereby an intermediate pressure is created between that in the first chamber and that of the air intake system.

* * * * *